(12) United States Patent
Balasubramanian

(10) Patent No.: US 9,021,375 B2
(45) Date of Patent: Apr. 28, 2015

(54) NOTIFICATION OF STATE TRANSITION OF AN OUT-OF-FOCUS APPLICATION

(75) Inventor: Swaminathan Balasubramanian, Sterling Heights, MI (US)

(73) Assignee: International Business Machines Corporation, Armonk, NY (US)

(*) Notice: Subject to any disclaimer, the term of this patent is extended or adjusted under 35 U.S.C. 154(b) by 2278 days.

(21) Appl. No.: 11/756,700

(22) Filed: Jun. 1, 2007

(65) Prior Publication Data

US 2008/0046100 A1  Feb. 21, 2008

Related U.S. Application Data

(63) Continuation-in-part of application No. 11/505,131, filed on Aug. 15, 2006.

(51) Int. Cl.

| | |
|---|---|
| G06F 3/048 | (2013.01) |
| G06F 11/32 | (2006.01) |
| G05B 23/02 | (2006.01) |
| G06F 9/44 | (2006.01) |
| G06F 3/0482 | (2013.01) |
| G06F 3/0481 | (2013.01) |
| G09G 5/14 | (2006.01) |

(52) U.S. Cl.
CPC ............ G06F 11/327 (2013.01); G06F 3/0482 (2013.01); G06F 3/04817 (2013.01); G09G 5/14 (2013.01); G05B 23/0267 (2013.01); G06F 3/0481 (2013.01); G06F 9/4443 (2013.01)

(58) Field of Classification Search
CPC . G06F 3/0481; G06F 3/0482; G06F 3/04817; G09G 5/14

USPC .......................................... 715/772, 810, 802
See application file for complete search history.

(56) References Cited

U.S. PATENT DOCUMENTS

| | | | | |
|---|---|---|---|---|
| 5,559,802 A | * | 9/1996 | Robinson et al. | 370/469 |
| 5,617,526 A | * | 4/1997 | Oran et al. | 715/779 |
| 5,867,160 A | * | 2/1999 | Kraft et al. | 715/803 |
| 5,991,794 A | * | 11/1999 | Hodges et al. | 718/107 |
| 6,115,041 A | * | 9/2000 | Dang et al. | 715/767 |
| 6,405,361 B1 | * | 6/2002 | Broy et al. | 717/104 |

(Continued)

OTHER PUBLICATIONS

Bardram et al., "Support for Activity-Based Computing in a Personal Computing Operating System", Fig. 2, Status Buttons has icon overlay, Apr. 2006.*

(Continued)

Primary Examiner — Ece Hur
(74) Attorney, Agent, or Firm — Schmeiser, Olsen & Watts

(57) ABSTRACT

A method, a computer program product, a computer system and a method for supporting an application. The method includes: starting an application having multiple possible states and multiple possible state transitions, the application having rules specifying computer screen display actions to be performed upon state transitions of the application; placing the application in a current display mode and displaying the current display mode on a computer screen; monitoring the state of the software application; upon a state transition of from a current state to a new state, the state transition not initialed by a user of the application, applying a rule associated with the state transition to determine a new display mode; changing a display mode of the application from the current display mode to the new display mode based upon the rules; and displaying the new display mode on the computer screen.

20 Claims, 11 Drawing Sheets

(56) References Cited

U.S. PATENT DOCUMENTS

| | | | |
|---|---|---|---|
| 6,414,697 B1* | 7/2002 | Amro et al. | 715/772 |
| 6,756,999 B2* | 6/2004 | Stoakley et al. | 715/779 |
| 6,857,105 B1 | 2/2005 | Fox et al. | |
| 7,137,119 B1* | 11/2006 | Sankaranarayan et al. | 718/103 |
| 7,996,045 B1* | 8/2011 | Bauer et al. | 455/566 |
| 8,060,063 B1* | 11/2011 | Wageman | 455/412.2 |
| 8,539,376 B2* | 9/2013 | Utsuki et al. | 715/835 |
| 2001/0035882 A1 | 11/2001 | Stoakley et al. | |
| 2002/0060700 A1* | 5/2002 | Sone | 345/810 |
| 2003/0041179 A1* | 2/2003 | Snead et al. | 709/321 |
| 2004/0056898 A1* | 3/2004 | Jetha et al. | 345/781 |
| 2004/0066414 A1* | 4/2004 | Czerwinski et al. | 345/781 |
| 2006/0168538 A1* | 7/2006 | Stevens et al. | 715/779 |
| 2007/0006093 A1* | 1/2007 | Day et al. | 715/781 |
| 2007/0157099 A1 | 7/2007 | Haug | |
| 2007/0157223 A1* | 7/2007 | Cordray et al. | 725/13 |
| 2007/0261005 A1* | 11/2007 | Kreiner | 715/830 |
| 2008/0046832 A1 | 2/2008 | Balasubramanian | |
| 2008/0155454 A1 | 6/2008 | Balasubramanian | |
| 2008/0155455 A1 | 6/2008 | Balasubramanian | |
| 2008/0163258 A1 | 7/2008 | Balasubramanian | |
| 2010/0077347 A1* | 3/2010 | Kirtane et al. | 715/803 |
| 2010/0138779 A1 | 6/2010 | Portele et al. | |
| 2010/0262924 A1* | 10/2010 | Kalu | 715/753 |
| 2011/0055314 A1* | 3/2011 | Rosenstein et al. | 709/203 |
| 2012/0081278 A1* | 4/2012 | Freedman | 345/156 |

OTHER PUBLICATIONS

Icon Overlay, Google Images, Jul. 10, 2006.*
Dantzich et al., 2002, Notification Summary, pp. 11.*
Office Action dated Aug. 8, 2008 from U.S. Appl. No. 11/505,131.
Final Office Action dated Nov. 24, 2008 from U.S. Appl. No. 11/505,131.
Office Action (Mail Date Dec. 22, 2010) for U.S. Appl. No. 12/039,935, filed Feb. 29, 2008; Confirmation No. 8474.
Office Action (Mail Date Apr. 8, 2011) for U.S. Appl. No. 12/039,977, filed Feb. 29, 2008; Confirmation No. 8538.
Response (filed Sep. 9, 2008) to Office Action (Mail Date Aug. 8, 2008) for U.S. Appl. No. 11/505,131, filed Aug. 15, 2006; Conf. No. 4568.
Response (filed Dec. 15, 2008) to Final Office Action (Mail Date Nov. 24, 2008) for U.S. Appl. No. 11/505,131, filed Aug. 15, 2006; Conf. No. 4568.
Advisory Action (Mail Date Jan. 5, 2009) for U.S. Appl. No. 11/505,131, filed Aug. 15, 2006; Conf. No. 4568.
Notice of Appeal (filed Feb. 24, 2009) for U.S. Appl. No. 11/505,131, filed Aug. 15, 2006; Conf. No. 4568.
Appeal Brief (filed May 15, 2009) for U.S. Appl. No. 11/505,131, filed Aug. 15, 2006; Conf. No. 4568.
Examiner's Answer (Mail Date Jul. 22, 2009) for U.S. Appl. No. 11/505,131, filed Aug. 15, 2006; Conf. No. 4568.
Response (filed Feb. 23, 2011) to Office Action (Mail Date Dec. 22, 2010) for U.S. Appl. No. 12/039,935, filed Feb. 29, 2008; Conf. No. 8474.
Reply Brief (filed Sep. 10, 2009) for U.S. Appl. No. 11/505,131, filed Aug. 15, 2006; Conf. No. 4568.
Final Office Action (Mail Date May 9, 2011) for U.S. Appl. No. 12/039,935, filed Feb. 29, 2008; Conf. No. 8474.
Notice of Appeal (filed Jul. 8, 2011) for U.S. Appl. No. 12/039,935, filed Feb. 29, 2008; Conf. No. 8474.
Response (filed Jul. 5, 2011) to Office Action (Mail Date Apr. 8, 2011) for U.S. Appl. No. 12/039,977, filed Feb. 29, 2008; Conf. No. 8538.
Office Action (Mail Date Jul. 11, 2011) for U.S. Appl. No. 12/040,012, filed Feb. 29, 2008; Confirmation No. 8597.
Final Office Action (Mail Date Sep. 13, 2011) for U.S. Appl. No. 12/039,977, filed Feb. 29, 2008; Confirmation No. 8538.
Notice of Allowance (Mail Date Dec. 2, 2012) for U.S. Appl. No. 12/039,935, filed Feb. 29, 2008; Confirmation No. 8474.
Advisory Action (Mail Date Nov. 25, 2011) for U.S. Appl. No. 12/039,977, filed Feb. 29, 2008; Confirmation No. 8538.
Final Office Action (Mail Date Nov. 28, 2011) for U.S. Appl. No. 12/040,012, filed Feb. 29, 2008; Confirmation No. 8597.

* cited by examiner

NOTIFICATION OF STATE TRANSITION OF AN OUT-OF-FOCUS APPLICATION

This application is a Continuation-In-Part of copending application Ser. No. 11/505,131 filed on Aug. 15, 2006.

FIELD OF THE INVENTION

The present invention relates to the field of computer software; more specifically, it relates to method for notification of a user of a state transition of an out-of-focus software application.

BACKGROUND OF THE INVENTION

The widespread availability of high performance computers has enabled users to run multiple applications simultaneously on their workstations. This has resulted in applications competing for user attention and interruptions of applications the user is currently interfacing with. Furthermore, there is no uniform methodology for applications to obtain the user's attention. Users are thus subject to interruptions and productivity is adversely affected when an application is idle and waiting for user attention or the user is forced to transfer their attention to another application.

Therefore, there is a need for a method for applications to notify the user of an applications status and need for attention without interrupting the user and the application the user is currently working with.

SUMMARY OF THE INVENTION

A first aspect of the present invention is a method, comprising: starting an application having multiple possible states and multiple possible state transitions, the application having rules specifying computer screen display actions to be performed upon state transitions of the application; placing the application in a current display mode and displaying the current display mode on a computer screen; monitoring the state of the software application; upon a state transition of from a current state to a new state, the state transition not initiated by a user of the application, applying a rule associated with the state transition to determine a new display mode; changing a display mode of the application from the current display mode to the new display mode based upon the rules; and displaying the new display mode on the computer screen.

A second aspect of the present invention is a computer program product, comprising a computer useable medium having a computer readable program therein, wherein the computer readable program when executed on a computer causes the computer to: load an application into computer memory, the software application having multiple possible states and multiple possible state transitions, the application having rules specifying computer screen display actions to be performed upon state transitions of the application; place the application in a current display mode and display the current display mode on a computer screen; monitor the state of the software application; upon a state transition of from a current state to a new state, the state transition not initiated by a user of the application, apply a rule associated with the state transition to determine a new display mode; change a display mode of the application from the current display mode to the new display mode based upon the rules; and display the new display mode on the computer screen.

A third aspect of the present invention is a computer system comprising a processor, an address/data bus coupled to the processor, and a computer-readable memory unit coupled to communicate with the processor, the memory unit containing instructions that when executed implement a method for dynamically notifying a user of a change in state of an application running on the computer system, the method comprising the computer implemented steps of: loading a software application into the memory unit, the application having multiple possible states and multiple possible state transitions, the application having notification priorities specifying computer screen display actions to be performed upon state transitions of the application or having rules to determine notification priorities; loading a state transition registry and a state transition handler into the memory unit; the application registering a set of state transitions and associated notification priorities, associated rules for determining notification priorities, or both associated notification priorities and associated rules for determining notification priorities with the state transition registry; placing the application in a current display mode and displaying the current display mode on a computer screen; monitoring the state of the software application; upon a state transition of from a current state to a new state, the state transition not initialed by a user of the application, notifying the state transition registry of a particular state transition that has occurred; the transition registry (i) selecting a particular notification priority associated with the particular state transition and passing the particular notification priority to the state transition handler or (ii) the state transition registry requesting the application to evaluate a particular rule associated with the particular state transition, the application evaluating the rule and passing a determined notification priority to the state transition registry, and the state transition registry passing the determined notification priority to the state transition handler; the state transition handler requesting an operating system running on the computer system to handle either the particular notification priority or the determined notification priority; and the operating system processing either the particular notification priority or the determined notification priority, the processing resulting in a change of a display mode of the application from the current display mode to the new display mode and displaying the new display mode on the computer screen.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
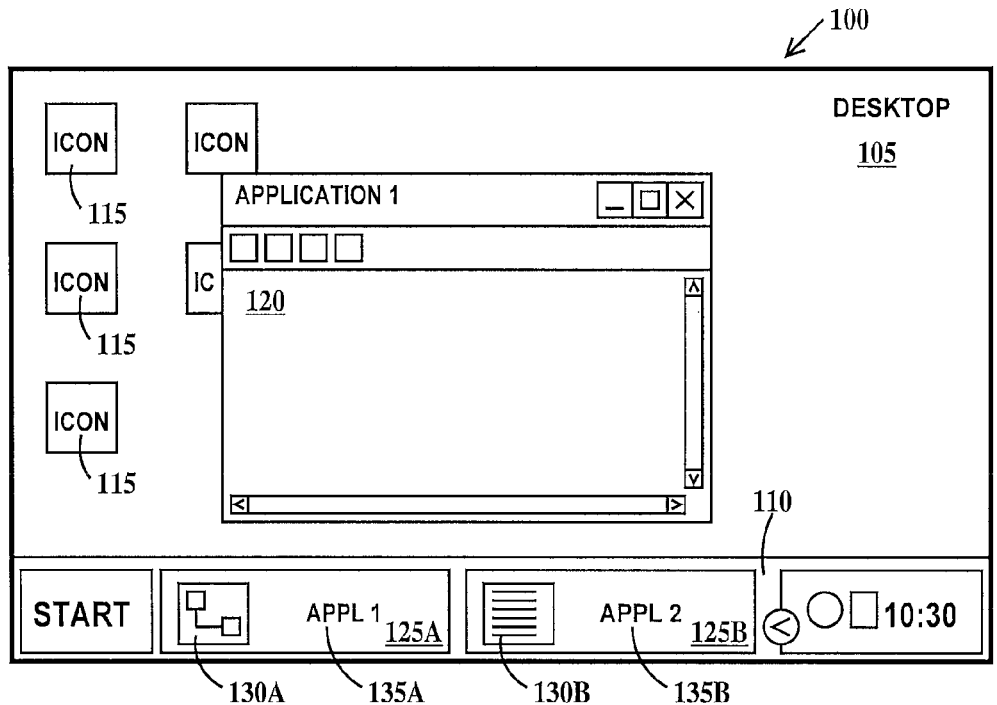
FIG. 1 is a schematic drawing of a user desktop illustrating an in-focus application and an out-of-focus application running simultaneously according to embodiments of the present invention.

A window is defined as a visual area containing a user interface displaying the output of and allowing input to a number of simultaneously running computer processes. A control widget is defined as means that a computer user interacts with in order to control and interface component such as a window or a text box. Control widgets come in two forms, virtual and physical. A button is an example of a control widget. A virtual button can be clicked with a mouse cursor while a physical button can be pressed with a finger.

In computing, the focus is the component of the graphical user interface, which is currently selected. Text entered at a keyboard or pasted from a clipboard is sent to the application, which currently has the focus. Graphical user interfaces also use a mouse cursor. Moving the mouse will typically move the mouse cursor over the screen and windows displayed on the screen without changing the focus. In a Microsoft™ windows system or an Apple™ computer, the focus can be changed by clicking on a component that can receive focus with the mouse. Clicking a mouse button when the mouse cursor is over a window selects the window to be in-focus. This is called a "focus follows click" policy or "click to focus". Focus may also be changed using the keyboard. In a UNIX computer system, the "focus follows the mouse cursor" policy is used.

An in-focus application is defined as a running application that has been selected by a control widget and to which any user input will be directed. For example, placing a cursor over a window and clicking a mouse button will put the application running in the window in focus and keyboard strokes will be inputted into the in-focus application. An out-of-focus application is a running application to which user input is not directed. For example, any keyboard strokes will be not be inputted into the out-of-focus application. Alternatively, an out-of-focus application can be defined as an application that is not in focus.

When multiple applications are running (running includes time when the application is idle, i.e., the application is loaded into memory but not processing), one application is considered "in-focus" and the others are considered "out-of-focus". Idle applications can receive input, but only when they are in-focus. Control widgets within windows may require a further click to focus them, to differentiate the different places input may go.

Examples of applications include, but are not limited to, word processors, spread sheets, computer aided design (CAD) programs, audio, picture and video editing programs, communication programs, email programs web browsers and various utility programs.

In certain operating systems, such as Microsoft™ Windows, the computer screen displays a desktop, which may include application desktop icons (control widgets) and a task bar (control widget). In the task bar a task button (control widget) is displayed for each running application. The task button includes a task button icon and a title. In-focus and out-of-focus applications may also appear in windows displayed on the desktop. The in-focus application is indicated by a highlighted task button and/or highlighted window associated with the in-focus application. A title-bar appears at the top of the window. The exit, minimize and restore/maximize buttons found in the upper right hand corner of the title bar are control widgets.

There are several types of special windows in a graphical user interface in addition to the application/document window displaying the application. One type of special window is a dialog box. In a dialog box appears when communication is requested or required outside the applications normal workflow between the application or operating system and the user. A dialog box is another type of widget. In non-model or modeless dialog box focus is not changed when it appears. In a modal dialog box, focus is changed to the dialog box.

The embodiments of the present invention will be described in the context of a windows-like operating system that utilizes a task bar, but is applicable to other types of operating systems such as UNIX, which do not use a task bar, but do display icons on the desktop. In the case of such operating systems, the features of the present invention are applied to the desktop icon instead of the task button icon. Alternatively, for applications that do use a desktop icons and task bar task button icons, icon overlays may be applied to both the desktop icons and the task button icons.

In one example, the present invention modifies the task button icons by adding an icon overlay to the task button icon. The icon overlay indicates the state of the application and changes when the application changes state (transitions between states) in order to dynamically notify the user of a change in state of the applications without forcing itself on the user. Icon overlays may be applied to only out-of-focus applications or both in-focus and out-of-focus applications.

FIG. 1 is a schematic drawing of a user desktop illustrating an in-focus application and an out-of-focus application running simultaneously according to embodiments of the present invention. In FIG. 1, a desktop 100 (displayed on a computer screen) includes a workspace region 105 and a task bar region 110. Displayed in workspace region are icons 115 for various applications and a window 120 displaying an in-focus application. Task bar region 110 includes a first task button 125A and a second task button 125B. First task button 125A includes a task button icon 130A and a title 135A (APPL 1). Second task button 125B includes a task button icon 130B and a title 135B (APPL 2). First task button 125A is associated with a first application running in window 120. Second task button 125B is associated with a second out-of-focus application. Task button icon 130B is the standard task button icon for the second application. The absence of an overlay icon indicates the second application is loaded but is in a state that does not require user notification (for example, idle).

Figure 2:
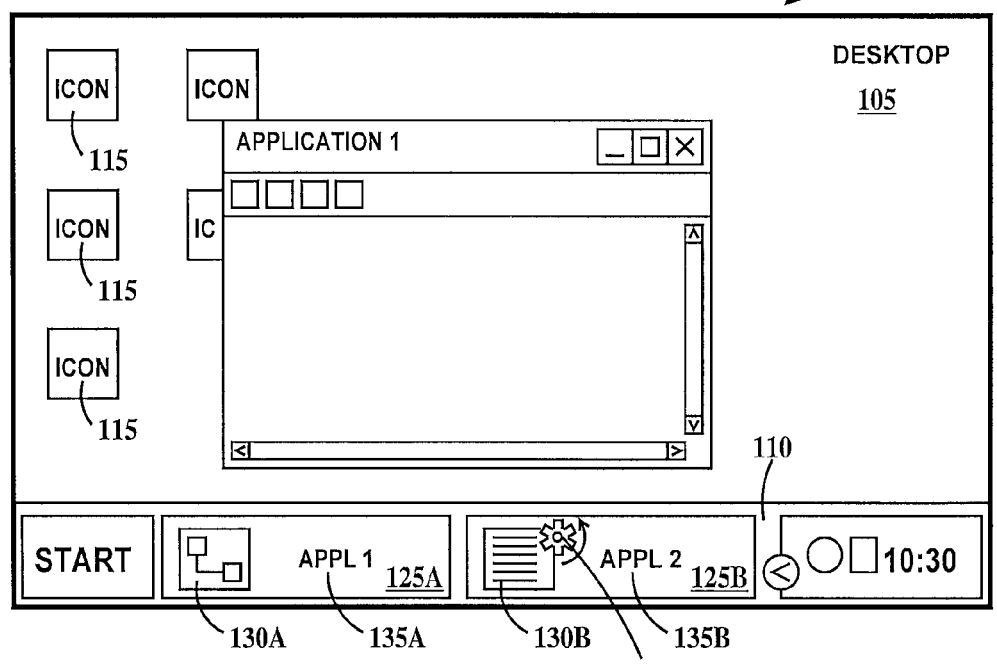
FIG. 2 is a schematic drawing of a user desktop illustrating the out-of-focus application indicating normal activity according to embodiments of the present invention.

FIG. 2 is a schematic drawing of a user desktop illustrating the out-of-focus application indicating normal activity according to embodiments of the present invention. In FIG. 2, the second application has changed state and is now running. To inform the user of the new status of the second application an overlay icon 140A is imposed over standard icon 130B. Overlay icon 140A may be animated. In the example of FIG. 2, overlay icon 140A is a spinning gear. Alternatively, standard icon 130B is replaced with a whole new icon that includes the overlay icon 140A graphics.

Figure 3:
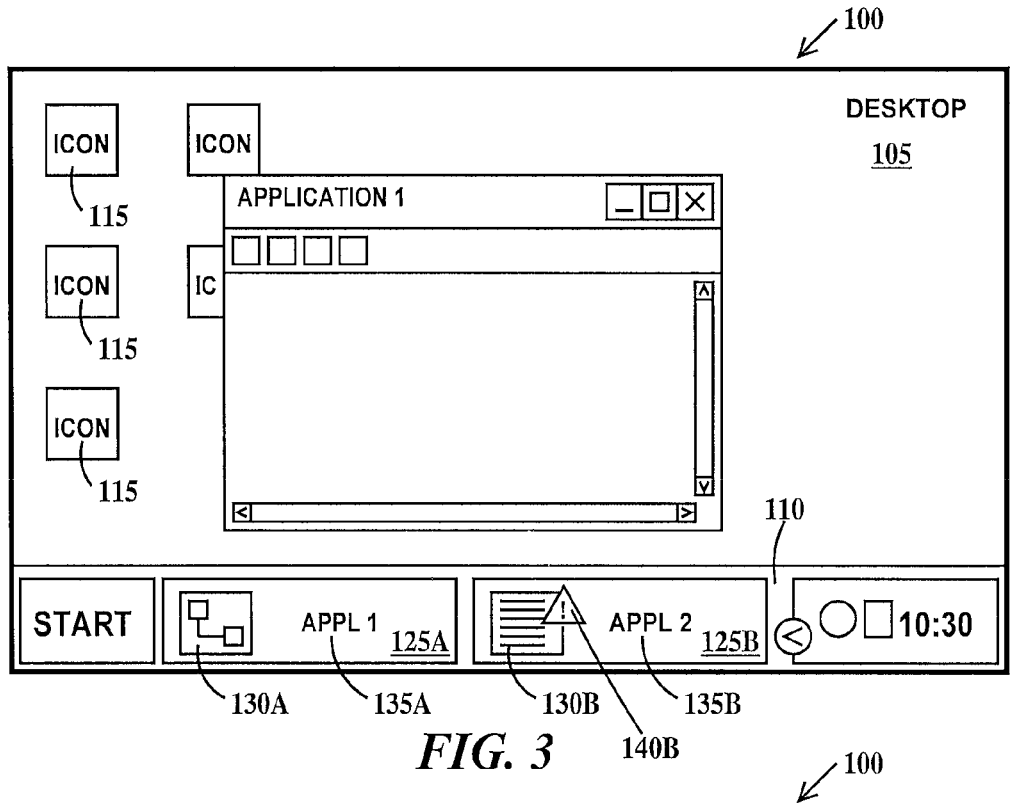
FIG. 3 is a schematic drawing of a user desktop illustrating the out-of-focus application indicating user response required according to embodiments of the present invention.

FIG. 3 is a schematic drawing of a user desktop illustrating the out-of-focus application indicating user response required according to embodiments of the present invention. In FIG. 3, the second application has again changed to a new state where processing has been stopped because user input is required. To inform the user of the new status of the second application (i.e., processing stopped because input is required) an overlay icon 140B is imposed over standard icon 130B. In the example of FIG. 3, overlay icon 140B is triangle with an exclamation point. In one example, the color of overlay icon may be selected to enhance the visual clue given by the presence of the overlay icon graphics. For example, overlay icon 140B may have a yellow background. In one example, an audio clue may be associated with overlay icon 140B. Combinations of animation, audio and color clues may be used together. Alternatively, standard icon 130B (see FIG. 1) is replaced with a whole new icon that includes the overlay icon 140B graphics. The out-of-focus application remains out-of-focus until the user presses second task button 125B, which will bring the second application up in a window so the user may supply the required input.

Figure 4:
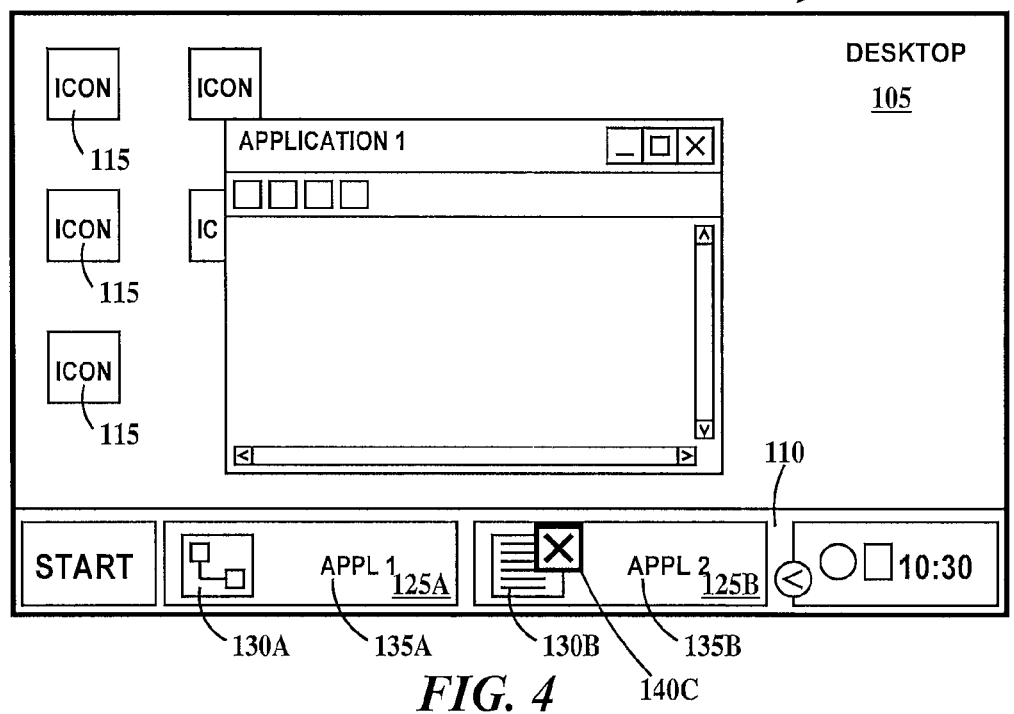
FIG. 4 is a schematic drawing of a user desktop illustrating the out-of-focus application indicating an error has occurred according to embodiments of the present invention.

FIG. 4 is a schematic drawing of a user desktop illustrating the out-of-focus application indicating an error has occurred according to embodiments of the present invention. In FIG. 4, the second application has again changed state where processing has been stopped because of an error. To inform the user of the new status of the second application (i.e., processing has stopped because an error has occurred) an overlay icon 140C is imposed over standard icon 130B. In one example, overlay icon 140C is animated. In the example of FIG. 4, overlay icon 140B is square with an X. In one example, the color of overlay icon may be selected to enhance the visual clue given by the presence of the overlay icon graphics. For example, overlay icon 140C may have a red background. In one example, an audio clue may be associated with overlay icon 140C. Combinations of animation, audio and color clues may be used together. Alternatively, standard icon 130B (see FIG. 1) is replaced with a whole new icon that includes the overlay icon 140B graphics. The out-of-focus application remains out-of-focus until the user the user presses second task button 125B, which will allow the user to respond to the error. There are two different actions possible as illustrated in FIGS. 5 and 6 and described infra.

Figure 5:
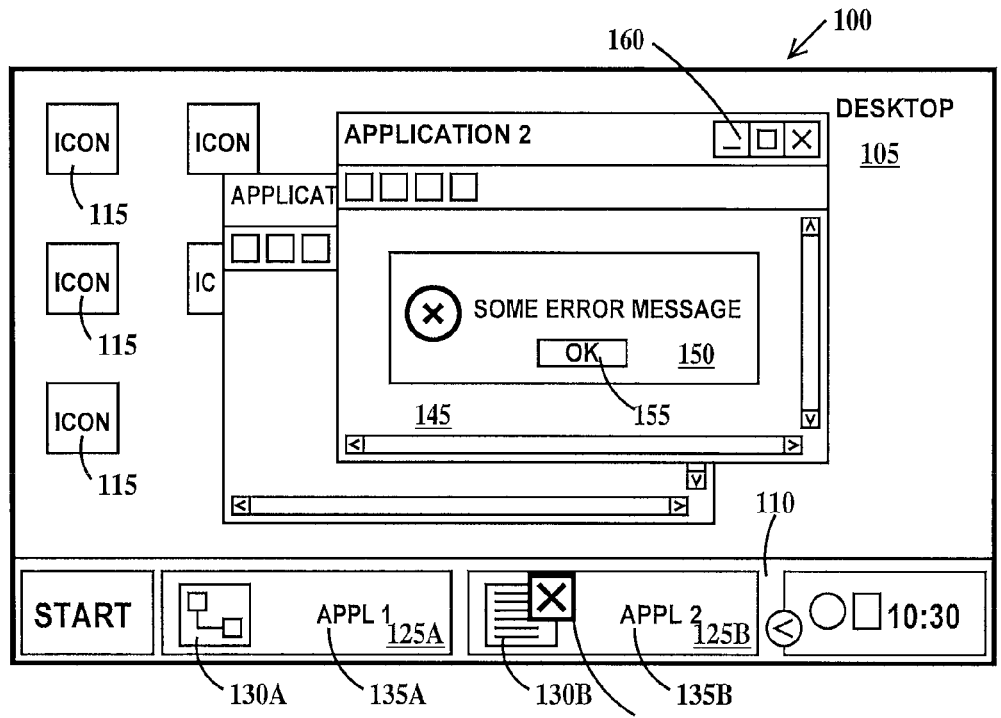
FIG. 5 is a schematic drawing of a user desktop after a user response to an error message of the out-of-focus application according to embodiments of the present invention.

FIG. 5 is a schematic drawing of a user desktop after a user response to an error message of the out-of-focus application according to embodiments of the present invention. In FIG. 5, the user has "pressed" task button 125B in response to the error clue and a window 145 for the second application has opened on desktop 105, bringing the second application into focus. Additionally, an error message window 150 has opened giving information about the error. After pressing an OK button 155, error message window 150 will close leaving window 145 open (the application will be in-focus) and the user may correct the error. The user may then close window 145 by pressing a minimize task button 160 returning the second application to out-of-focus operation.

Figure 6:
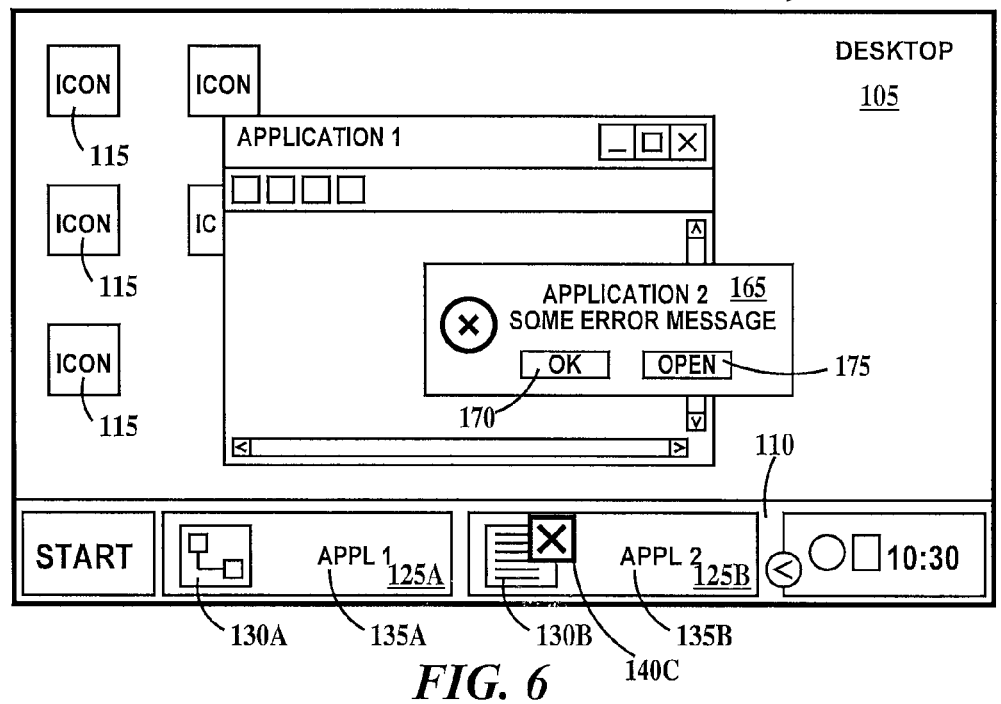
FIG. 6 is a schematic drawing of an alternative user desktop after a user response to an error message of the out-of-focus application according to embodiments of the present invention.

FIG. 6 is a schematic drawing of an alternative user desktop after a user response to an error message of the out-of-focus application according to embodiments of the present invention. In FIG. 6, the user has "pressed" task button 125B in response to the error clue and error message window 165 giving information about the error for the second application has opened on desktop 105. However, the second application is still out-of-focus. If the user "presses" an OK button 170, error window 165 will close, the second application will remain out-of-focus and overlay icon 140C is still present. If the user "presses" an OPEN button 175, error message window 165 will close and a window similar to window 145 of FIG. 5 will open. The application will be in-focus and the user may correct the error. The user may then close this window by pressing a minimize task button returning the second application to out-of-focus mode. This alternative behavior of the application allows the user to determine when to deal with the error without changing the focus of any application.

Figure 7A:
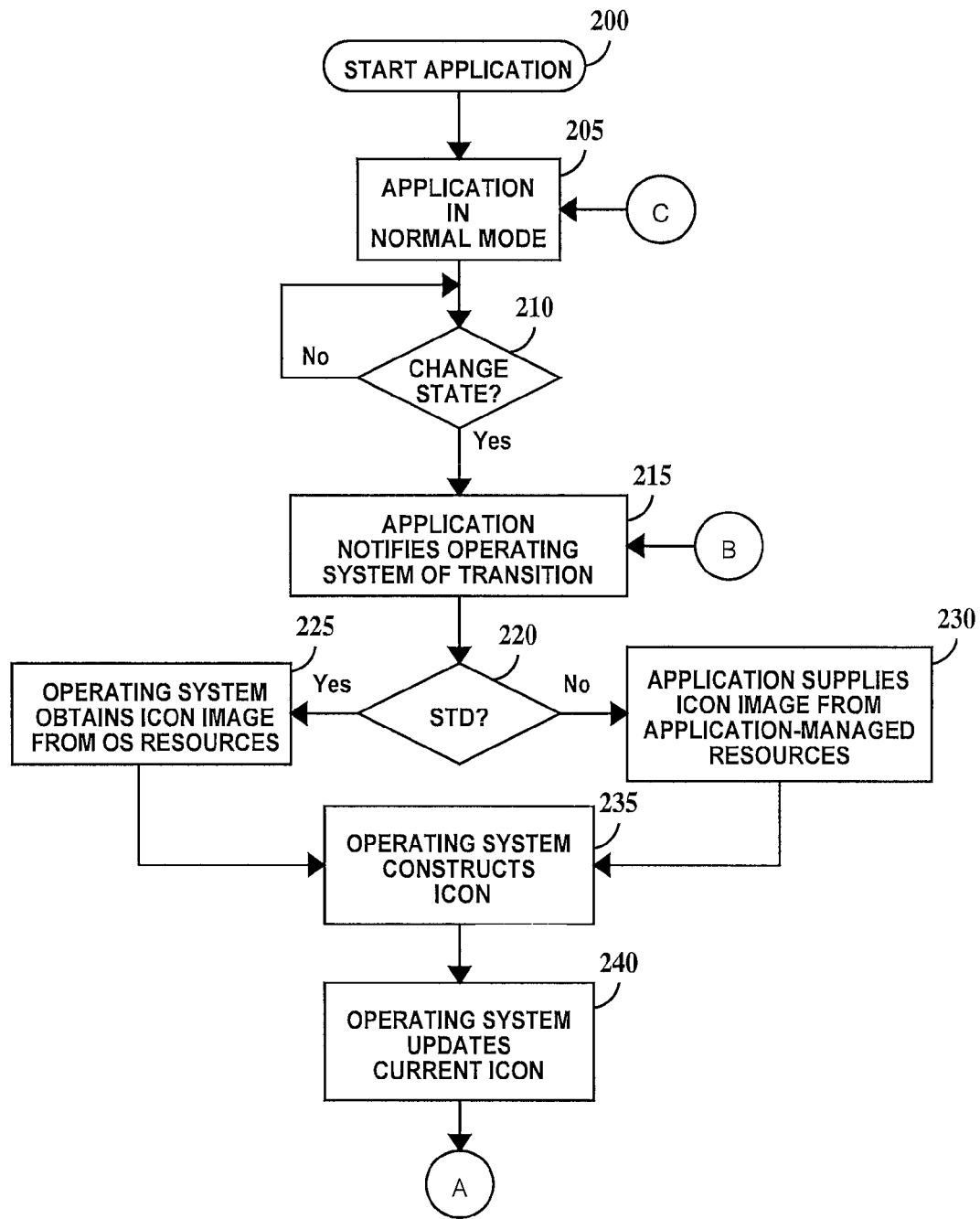
FIGS. 7A and 7B are flowcharts illustrating the method of user notification of a state transition of an out-of-focus application according to embodiments of the present invention.
Figure 7B:
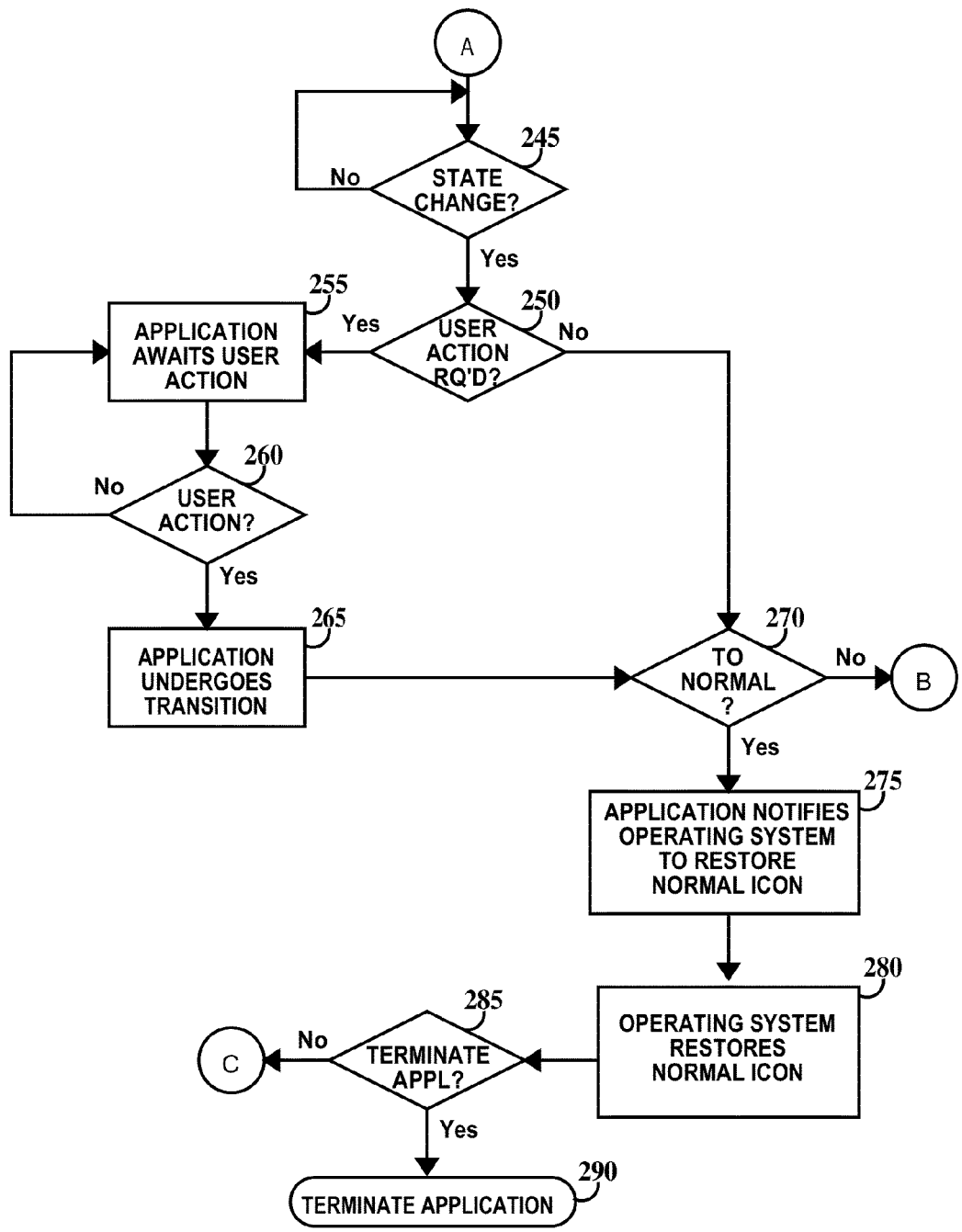

FIGS. 7A and 7B are flowcharts illustrating the method of user notification of a state transition of an out-of-focus application according to embodiments of the present invention. In step 200 the user starts an application. Alternatively, the application is started by the operating system (OS) at boot-up, at a predetermined time or day, or by another application. In step 205, the application is initialized to a normal state (i.e. idle), the application minimized (placed in out-of-focus mode) by the user, OS, or another application and a normal icon placed in the task button. In step 210, the application continually monitors itself for a change in state until a change in state occurs and the method proceeds to step 215. Examples of changes of state include but are not limited to, transitions from an idle state to processing state and vice versa, from a processing state to a input required state and vice versa, from the processing state to an error state and vice versa, and from one processing state to another processing state. A processing state is a state where the program is performing a normal task, such as a calculation, a search, downloading/uploading from/to a server, retrieving/storing information and other tasks the application was designed to perform.

In step 215, the application notifies the OS of a change in state. In step 220 it is determined if the transition is to a standard state. A standard state is a state that the application enters that has the same semantics across different applications. (for example, an error state or a user input required state). If the transition is a to a standard state, then in step 225, the OS obtains an icon image from OS managed resources, otherwise, in step 230, the application supplies an overlay icon image from application managed resources. Next in step 235, the OS constructs an updated icon and in step 240 the OS replaces the current icon (a desktop icon, a task button icon, or both) with the updated icon. The updated icon is a normal icon, an overlay icon on top of the normal icon or a new construct icon combining of both the normal icon image and the overlay icon image. The method then proceeds to step 245 of FIG. 7B.

Turning to FIG. 7B, in step 245 the application continually monitors itself for a change of state. When a change of state is detected, the method proceeds to step 250. In step 250, it is determined if user action is required. If user action is required then the method proceeds to step 255 where the application is put into a wait for user action mode and in step 260 the application continually monitors itself for user action. Then, when user action occurs, in step 265, the application undergoes the state transition and the method proceeds to step 270. Returning to step 250, if the transition requires no user action then the method proceeds directly to step 270. In step 270 if the transition is to normal mode then the method proceeds to step 275, otherwise the method proceeds to step 215 of FIG. 7A.

In step 275, the application notifies the OS to replace the current icon with the normal icon and in step 280 the OS restores the normal icon. Next in step 285, it is determined if the application is to terminate (either with or without user input). If the application is to terminate, then in step 290 the application is terminated and any task buttons removed from the task bar. Otherwise the method proceeds to step 205 of FIG. 7A.

Figure 8:
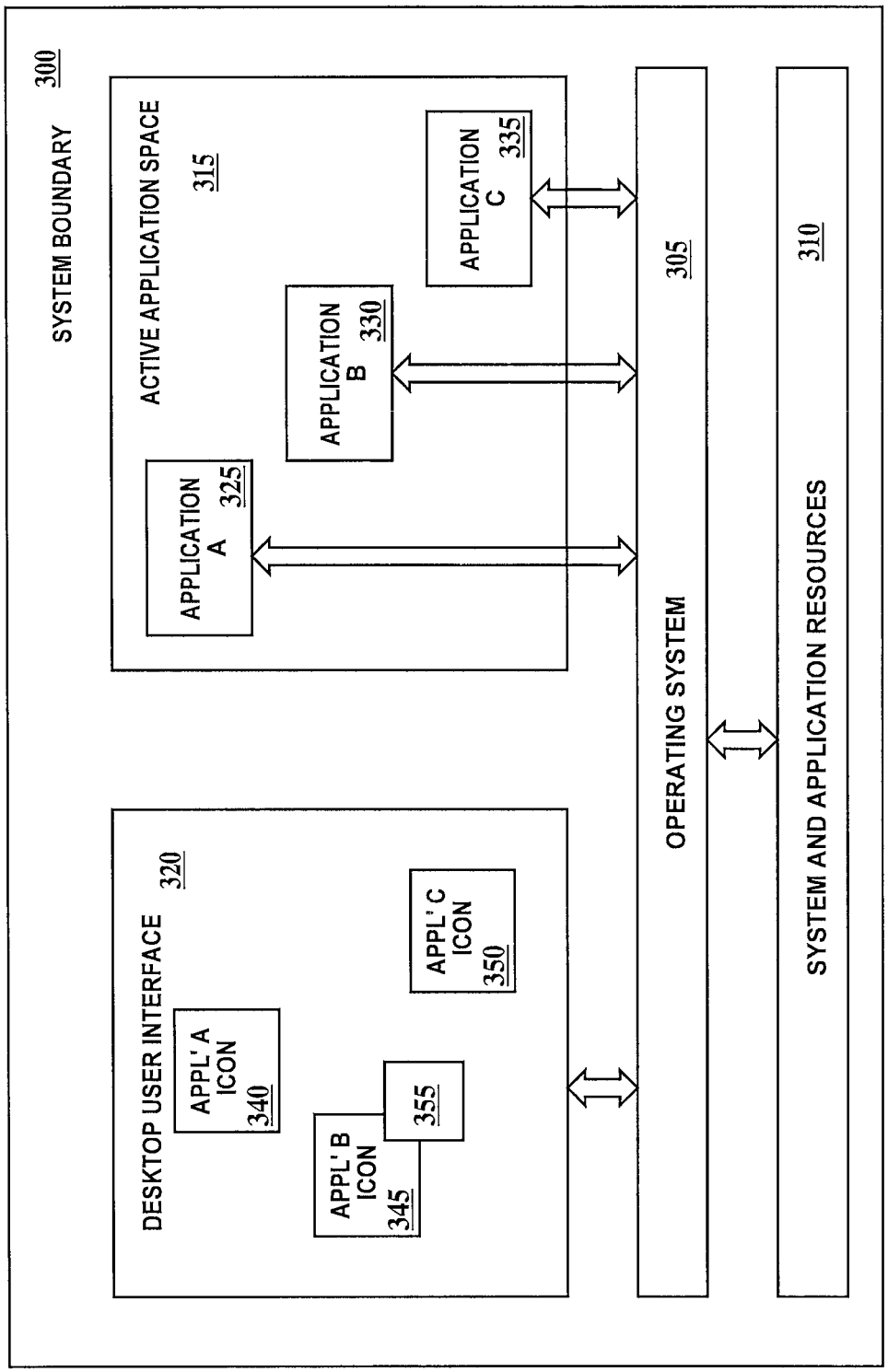
FIG. 8 is a system diagram for implementing the method of user notification of a state transition of an out-of-focus application according to embodiments of the present invention.

FIG. 8 is a system diagram for implementing the method of user notification of a state transition of an out-of-focus application according to embodiments of the present invention. In FIG. 8, a system boundary 300 includes an OS 305, system and application resources 310, active application space 315 and a desktop user interface 320. Active application space 315 includes exemplary applications 325, 330 and 335. Application 325 is in-focus and applications 330 and 335 are out-of-focus. Application 330 in a non-normal state and application 350 is in a normal state. Desktop user interface 320 includes icons 340, 345 and 350. Icons 340, 345 and 350 are associated respectively with applications 325, 330 and 335. Icon 345 includes and overlay icon 355.

Applications 325, 330 and 335 interface with OS 305. OS 305 interfaces with system and application resources 310 and desktop user interface 320. Non-normal icon images and overlay icon images for applications 325, 330 and 335 are passed to system and application resources 310 through OS 305. When icons 340, 345 and 350 are to be constructed as well as overlay icons such as 355, the icon image resources are retrieved from system and application resources 310 by the OS and the icons constructed in desktop user interface 320 by the OS.

Generally, the method described herein with respect to user notification of a state transition of an out-of-focus application is practiced with a general-purpose computer and the method may be coded as a set of instructions on removable or hard media for use by the general-purpose computer.

Figure 9:
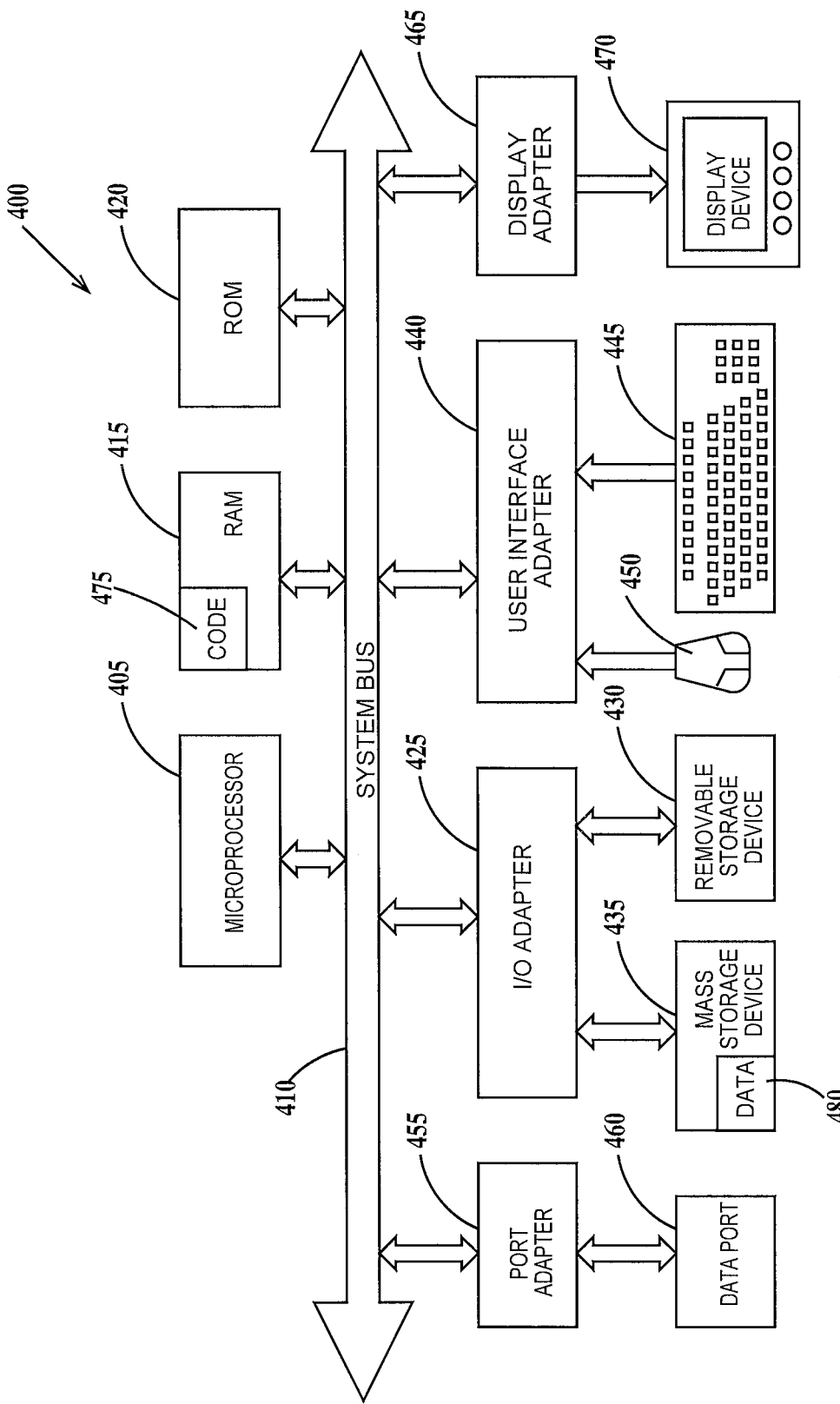
FIG. 9 is a schematic block diagram of a general-purpose computer for practicing the embodiments of the present invention.

FIG. 9 is a schematic block diagram of a general-purpose computer for practicing the embodiments of the present invention. In FIG. 9, computer system 400 has at least one microprocessor or central processing unit (CPU) 405. CPU 405 is interconnected via a system bus 410 to a dynamic random access memory (DRAM) device 415 and a read-only memory (ROM) device 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

Either of devices 415 and 420 includes contains the basic operating system for computer system 400. Removable data and/or program storage device 430 may be a magnetic media such as a floppy drive, a tape drive or a removable hard disk drive or optical media such as CD ROM or a digital video disc (DVD) or solid state memory such as ROM or DRAM or flash memory. Mass data and/or program storage device 435 may be a hard disk drive or an optical drive. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

One of devices 415, 420, 430 or 435 includes a computer code 475 (illustrated by way of example in device 415), which is a computer program that comprises computer-executable instructions. Computer code 475 includes an algorithm for notification of a user of a state transition of an out-of-focus software application (e.g. the algorithm of FIGS. 7A and 7B). CPU 405 executes computer code 475. Any of devices 415, 420, 430 or 435 may include input data 480 (illustrated by way of example in device 435) required by computer code 475. Display device 470 displays output from computer code 475.

Any or all of devices 415, 420, 430 and 435 (or one or more additional memory devices not shown in FIG. 9) may be used as a computer usable medium (or a computer readable medium or a program storage device) having a computer readable program embodied therein and/or having other data stored therein, wherein the computer readable program comprises computer code 475. Generally, a computer program product (or, alternatively, an article of manufacture) of the computer system 400 may comprise said computer usable medium (or said program storage device).

Further embodiments of the present invention described infra provide a capability for a user to control how application state transitions are handled. The user can configure the specific notification type or can configure rules to evaluate state change and select a specific notification type. Table I lists various states that an Application may be in.

TABLE I

| STATE | MEANING |
| --- | --- |
| Normal | The application is Idle |
| Processing | The application is performing a task such as a calculation, a search, downloading or uploading from or to a server, retrieving or storing information and other tasks the application was designed to perform. |
| Error | An error has occurred and user attention is needed. |
| Warning | A warning has occurred and user attention is required. |
| Information | Information is available for the user. |
| Input Required | Either input or some action is required from the user for the application to continue. |
| Application Defined | Specified by the application |

Normal, Processing, Warning, Information, Input Required and Error are states that are generic to all applications. Application Defined states are specific to each application.

When an application is out of focus and a transition of state (ST) occurs, the user needs to be notified. The user can determine how important a particular state transition is and what notification or action to take by specifying a notification priority (NP), which has a corresponding action associated with it. Table II lists an exemplary set of notification priorities and actions.

TABLE II

| NP | Action |
| --- | --- |
| Urgent | Interrupt the user by bringing the application in-focus or displaying a message box. |
| Normal | Wait a pre-defined duration of time before bringing the application in-focus or displaying a message box. |
| Low | Do not interrupt the user until this state transition has occurred a pre-defined number of times. Then bring the application in-focus or display a message box. |

TABLE II-continued

| NP | Action |
|---|---|
| Passive | Do not interrupt the user. Change a display icon, display an overlay icon over the current icon, or change an overlay icon. |
| None | Ignore and do not change the display mode of the application. |
| Other | User defined notification action. |

Additionally, the user may define rules to determine what notification priority to use when a state transition occurs. For example, in an email application, when new mail arrives, the user may wish to be notified immediately (NP=Urgent) if the email has been marked "High Priority." In another example, if certain web-sites are slow to respond or do not respond, the user may wish to be notified after waiting a predetermined duration of time (NP=Normal). The rules query the events (state transition and environment) and determine the notification priority. In the email example above the following rule could be defined:

i. If email is marked High Importance,
1. Then NP=Urgent
2. Else Np=Passive

It should be noted that rules are restricted so as to result in the selection of a notification priority, but the user can generate new notification priorities and associated actions. Thus notification priorities may be considered rules that automatically select one notification priority.

Figure 10:
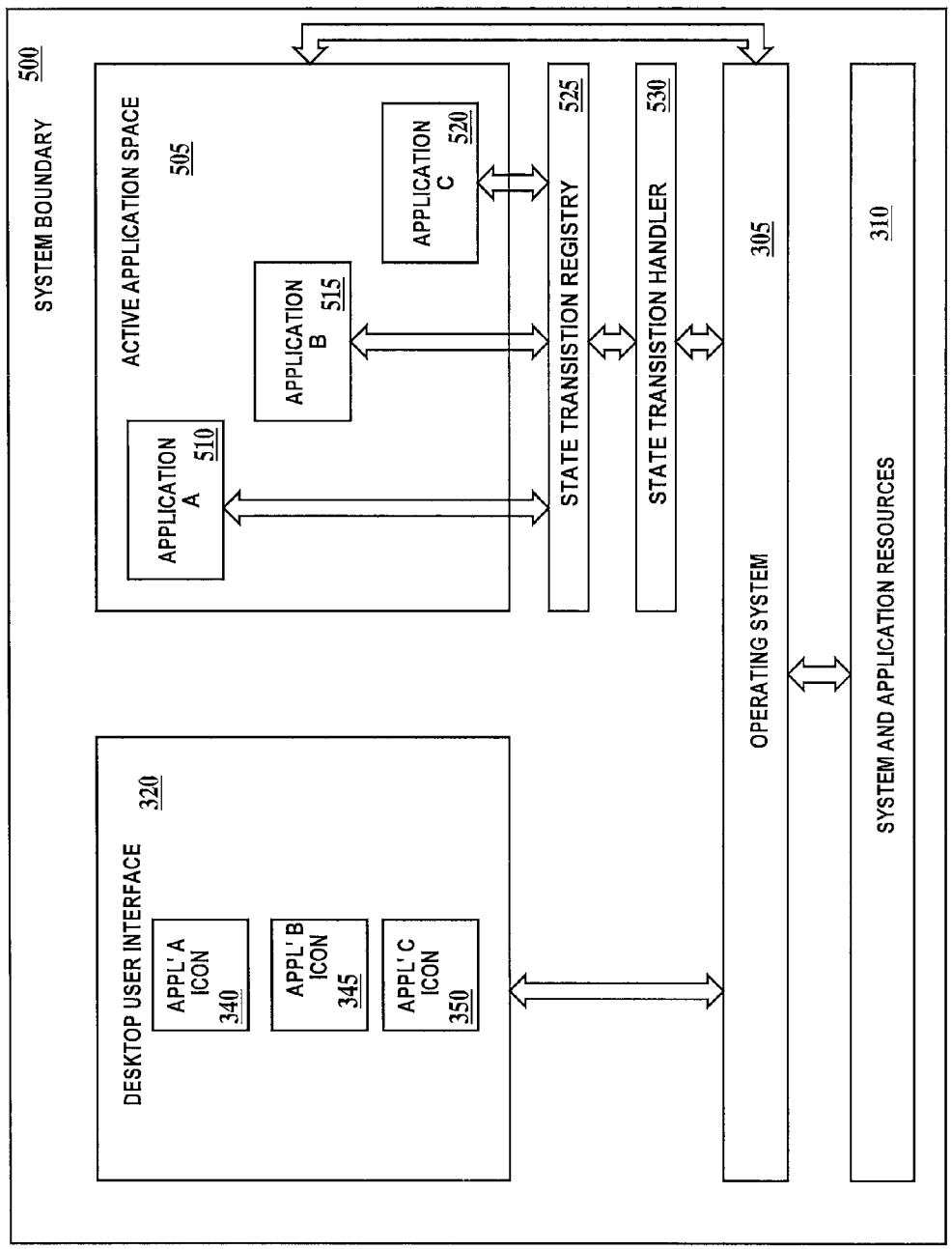
FIG. 10 is a system diagram for implementing the method of user notification of a state transition of an out-of-focus application according to further embodiments of the present invention.

FIG. 10 is a system diagram for implementing the method of user notification of a state transition of an out-of-focus application according to further embodiments of the present invention. In FIG. 10, a system boundary 500 is similar to system boundary 300 of FIG. 8 except active application space 315 is replaced with an active application space 505, applications 325, 330 and 335 are replaced with applications 510, 515 and 520 respectively and active application space 505 further includes a state transition registry 525 and a state transition handler 530. Also applications 325, 330 and 335 are connected to state transition registry 525 rather than operating system 305 as in FIG. 8. State transition handler 530 connects state transition registry 525 to operating system 305 and there is a secondary path between active application space 505 and operating system 305.

In FIG. 10, Application 510 is in focus, and applications 515 and 520 are out of focus. Each of applications 510, 515 and 520 has a corresponding application icon 340, 345 and 350 on desktop user interface 320. Applications 510, 515 and 520 are registered with state transitions registry 525. State transitions registry 525 maintains a list of possible states applications 510, 515 and 520 can be in. In one example, an application registers with the state transitions registry 525 when it is started for the first time. State transitions registry 525 also maintains state transitions configured by the user and the corresponding notification priorities or rules to be evaluated. When a pre-configured state transition occurs, state transitions registry 525 obtains the notification priority and delegates its handling to state transition handler 530. State transition handler 530 includes logic that either has a hardware module, a software module, or a combination of both to count the pre-defined unit of time for normal notification priorities and to count the number of times a particular state transition has occurred for low notification priorities and uses operating system 305 to process the notification priority.

Figures 11A, 11B:
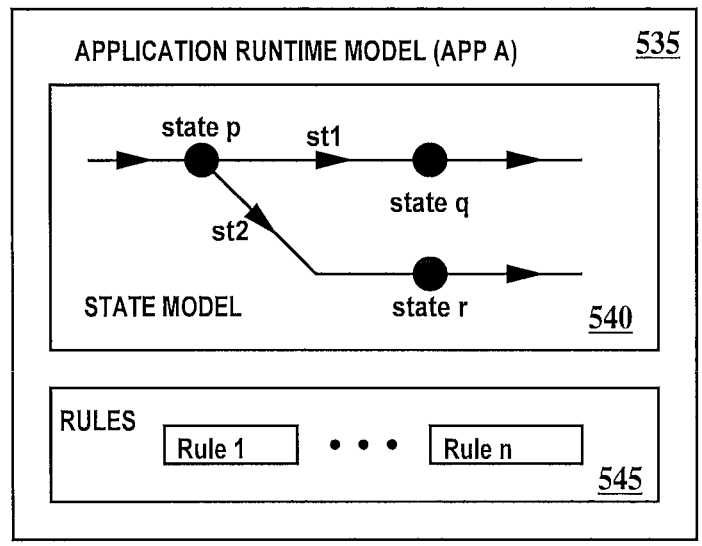
FIG. 11A is a schematic diagram of a portion of an application according to embodiments of the present invention.
FIG. 11B is a detailed diagram of the state transition registry of FIG. 10.

FIG. 11A is a schematic diagram of a portion of application 510 of FIG. 10 and FIG. 11B is a detailed diagram of the state transition registry of FIG. 10 according to embodiments of the present invention. In FIG. 11A, an application runtime model 535 includes a state model 540 and rules 545. Only a portion of the state model of application 510 (see FIG. 10) is illustrated in FIG. 11A. State model 540 shows there are two state transitions, st1 between state p and state q and st2 between state p and state r. It can be seen in FIG. 11B, that state transition st1 is associated with a notification priority URGENT, while state transition st2 is associated with a rule 1. In the case of st1, the notification priority is URGENT. Thus the user is interrupted when the application goes from state-p to state-q (see Table II). In the case of st2, a Rule 1 that is supplied by the application needs to be executed. The application executes Rule 1, and the rule outputs the notification priority to state transition registry 525 (see FIG. 10), which then informs state transition handler 530 (see FIG. 10) to process the notification priority. State transitions can be configured based on the ending state, the starting state or both the starting and ending states. In one example, the NP could always be URGENT if the ending state is an error state.

Figure 12A:
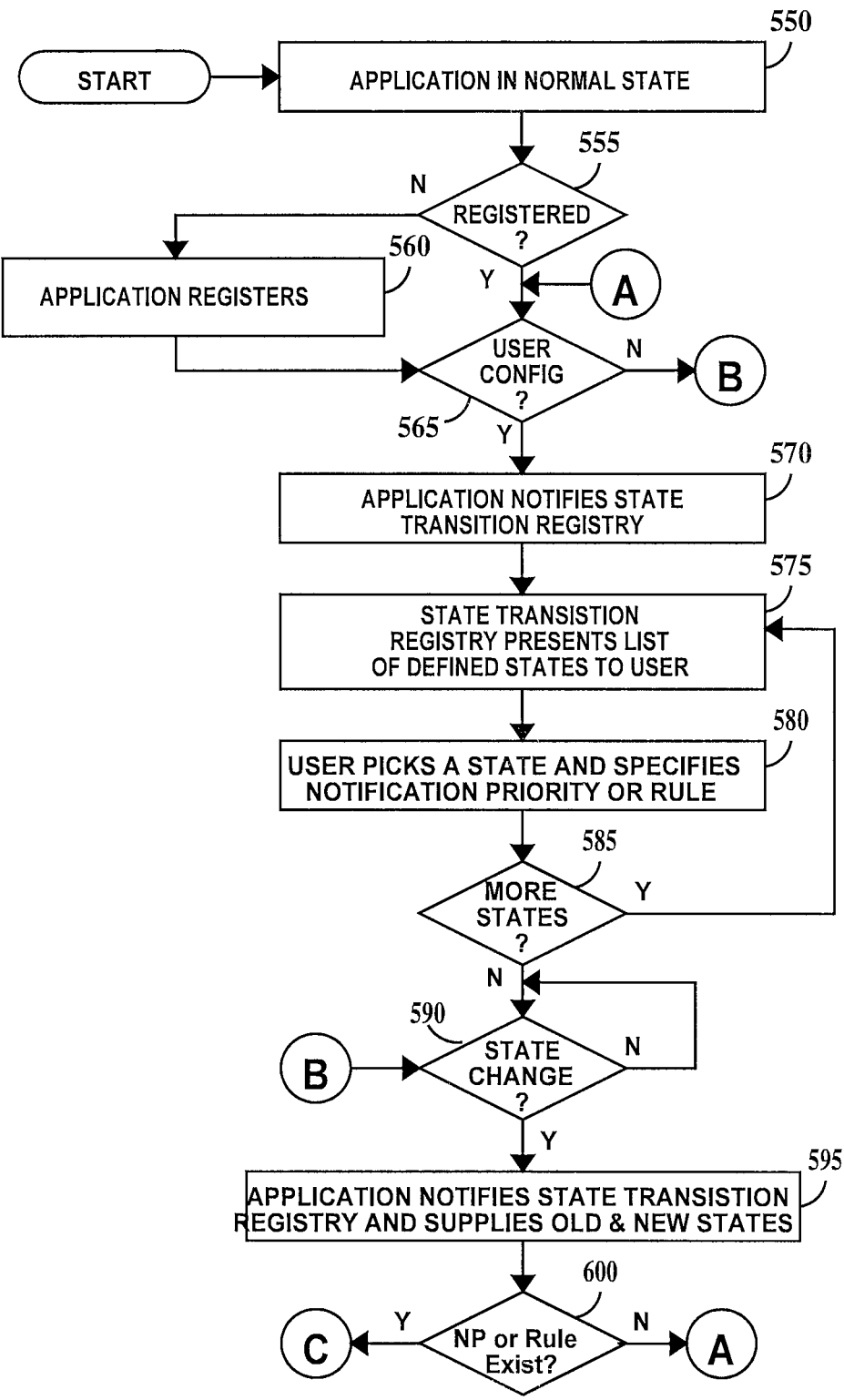
FIGS. 12A and 12B flowcharts illustrating the method of user notification of a state transition of an out-of-focus application according to further embodiments of the present invention.
Figure 12B:
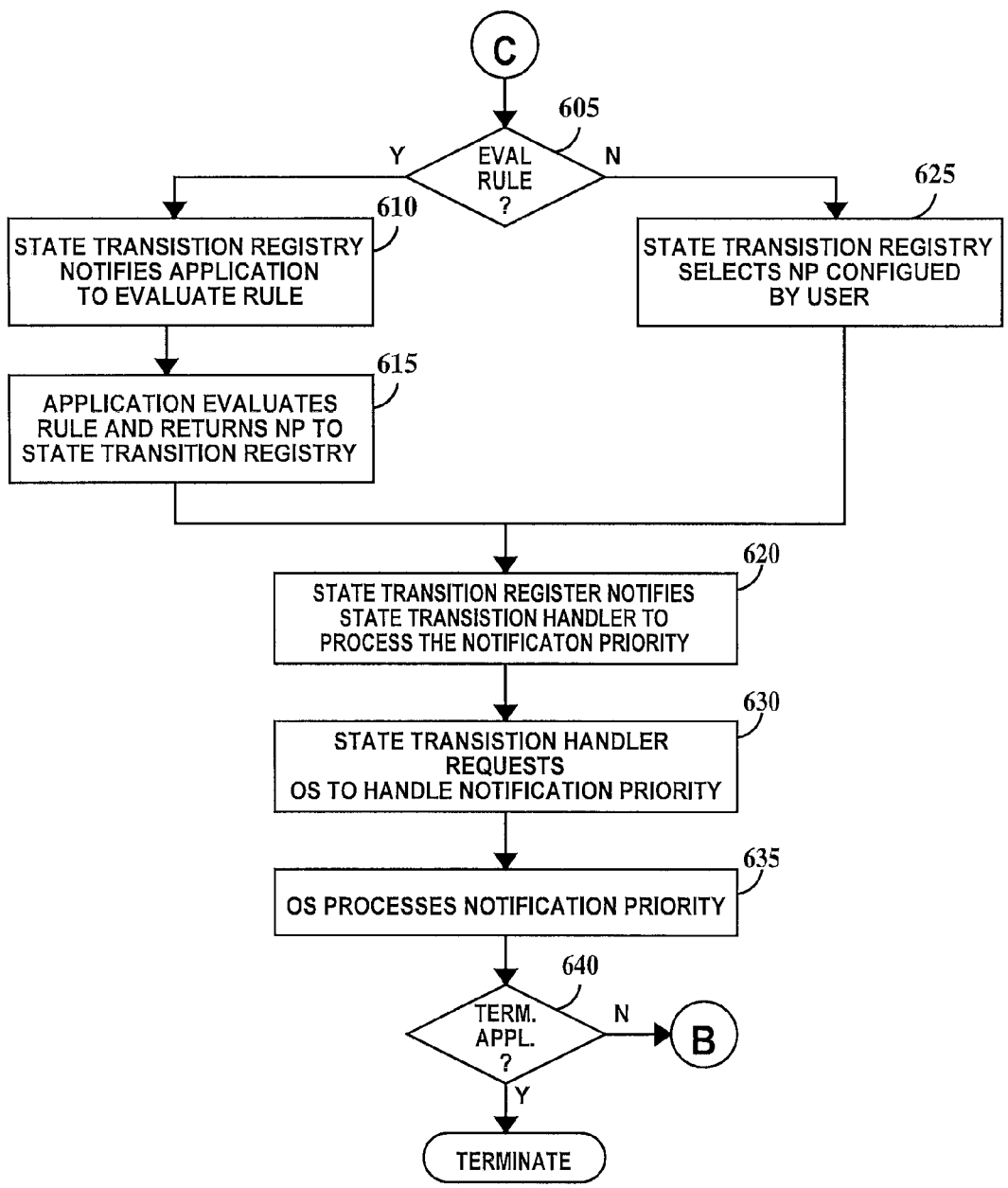

FIGS. 12A and 12B flowcharts illustrating the method of user notification of a state transition of an out-of-focus application according to further embodiments of the present invention. Referring to FIG. 12A, in step 550, the application enters the normal (or idle) state and is placed in out of focus mode by the user. In step 555, it is determined if the application is registered with the state transition registry. If the application is registered then the method proceeds to step 565. If the application is not registered, then in step 560 the application registers and the application supplies a list of defined state transitions and defined rules to the state transition registry and the method proceeds to step 565. Next, in step 565 if the user requests configuration of state transition notifications (which is automatic with the first time an application registers) then steps 570, 575, 580 and 585 are executed in sequence, otherwise the method proceeds to step 590 via connector B. In step 570, the application notifies the state transition register that the user wants to configure the state transition registry and in step 575, the state transition registry presents the list of defined states to the user. Next, in step 580, the user selects a state transition and assigns a notification priority or a rule to that state. In step 585, if more state transitions are to be configured, then the method loops to step 575, otherwise the method proceeds to step 590. In step 590 the state transition registry continually monitors the application for a change of state. If there is a change of state of the application then in step 595 the state transition registry examines the old and new states supplied by the application upon the state transition and in step 600 the state transition registry determines if a notification priority or rule is configured for that state transition. If no notification priority or rule is configured the method loops back to step 565 via connector A, otherwise the method proceeds to step 605 of FIG. 12B via connector C. Alternatively, instead of looping back to step 565, a default notification priority may be selected by the state transition registry and the method then proceeds to step 605.

Referring to FIG. 12B, in step 605 if a rule is to be evaluated then the method proceeds to step 610. In step 610 the state transition registry notifies the application to evaluate the rule and in step 612, the application evaluates the rule and returns the resulting notification priority to the state transition registry and the method proceeds to step 620. Returning to step 605, in step 605 if a rule is not to be evaluated (then there must be a notification priority) so the state transition registry selects the notification priority previously selected by the user for the current state transition and the method proceeds to step 620. Then, in step 620, the state transition registry notifies the state transition handler to process the notification priority, in step 630, the state transition handler requests the operating system to process the priority notification, and in step 635 the operating system processes the priority notification. The change in screen display as a result of the operating system processing a notification priority have been discussed supra. In step 640, it is determined if the application is to be terminated. If the application is to be terminated than the method ends, otherwise the method proceeds to step 590 of FIG. 12A via connector B.

Thus the present invention discloses a process for supporting computer infrastructure, integrating, hosting, maintaining, and deploying computer-readable code into the computer system 400, wherein the code in combination with the computer system 90 is capable of performing a method for user notification of a state transition of an out-of-focus application.

Thus the embodiments of the present invention provide a method for applications to notify the user of an applications status or need for attention without interrupting the user and the application the user is currently working with.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore it is intended that the following claims cover all such modifications and changes as fall within the true spirit and scope of the invention.

What is claimed is:

1. A method, comprising:
   starting a software application having multiple possible states and multiple possible state transitions, said application having rules specifying computer screen display actions to be performed upon state transitions of said application, said application registering possible states of application said with a state transition registry;
   placing said application in a current display mode and displaying said current display mode on a computer screen;
   monitoring the state of said application in said state transition registry, said state transition registry maintaining a list of possible states of said application, including states configured by a user, and corresponding notification priorities, rules, or both notification priorities and rules to be evaluated to determine a new display mode;
   upon a state transition of said application from a current state to a new state, said state transition not initiated by a user of said application, either (i) said state transition registry requesting said application to evaluate a rule associated with said state transition to determine said new display mode of said application and then said application notifying said state transition registry of said new display mode, or (ii) said state transition registry determining said new display mode from a predetermined display mode associated with said state transition;
   said state transition registry notifying a state transition handler of said new display mode;
   said transition handler notifying an operating system to apply said new display mode;
   said operating system changing a display mode of said application from said current display mode to said new display mode; and
   displaying said new display mode of said application on said computer screen.

2. The method of claim 1, wherein each state of said multiple possible states is independently selected from the group consisting of an idle state, a processing state, an error state, a warning state, an input required state and one or more application specific states.

3. The method of claim 1, wherein each rule selects an action selected from the group consisting of (i) bringing said application in-focus or displaying a message box, (ii) waiting a pre-defined duration of time before bringing said application in-focus or displaying a message box, (iii) waiting until a particular state transition has occurred a pre-defined number of times before bringing said application in-focus or displaying a message box, (iv) changing a display icon, (v) not changing the display mode of said application, and (vi) other user defined notification actions.

4. The method of claim 3 wherein said changing said display icon includes (1) when said displayed icon is a standard icon, adding an overlay icon to said standard icon, said standard icon identifying said application and said overlay icon indicating said new state of said application or (2) when said displayed icon includes an overlay icon over said standard icon, changing said overlay icon, said changed overlay icon indicating said new state of said application or (3) when said displayed icon includes an overlay icon over said standard icon, removing said overlay icon, said standard icon indicating said new state of said application.

5. The method of claim 1, further including:
   a user configuring one or more of said rules to perform an action.

6. The method of claim 1, wherein a rule selects from two or more computer screen display modes based on evaluation of an event that caused a particular state transition of said application.

7. The method of claim 1, further including:
   requesting a rule from a user when a particular state transition occurs for which no rule exists.

8. The method of claim 1, further including:
   registering state transitions of said application and corresponding rules associated with said state transitions with said state transition registry.

9. A computer program product, comprising a non-transitory computer useable medium having a computer readable program therein, wherein the computer readable program when executed on a computer causes the computer to: load a software application into computer memory, said application having multiple possible states and multiple possible state transitions, said application having rules specifying computer screen display actions to be performed upon state transitions of said application and register said application with a state transition registry; enable said state transition registry to maintain a list of possible states of said application, including states configured by a user, and corresponding notification priorities rules, or both notification priorities and rules to be evaluated to determine a new display mode; place said application in a current display mode and display said current display mode on a computer screen; monitor the state of said application in said state transition registry; upon a state transition of said application from a current state to a new state, said state transition not initiated by a user of said application, either (i) instruct said state transition registry to request said application to evaluate a rule associated with said state transition to determine said new display mode of said application and then have said application notify said state transition registry of said new display mode, or (ii) instruct said state transition registry to determine said new display mode from a predetermined display mode associated with said state transition; instruct said state transition registry to notify a state transition handler of said new display mode; instruct said transition handler to notify an operating system to apply said new display mode; instruct said operating system to change a display mode of said application from said current display mode to said new display mode; and display said new display mode of said application on said computer screen.

10. The computer program product of claim 9, wherein each state of said multiple possible states is independently selected from the group consisting of an idle state, a processing state, an error state, a warning state, an input required state and one or more application specific states.

11. The computer program product of claim 9, wherein each rule selects an action selected from the group consisting of (i) bringing said application in-focus or displaying a message box, (ii) waiting a pre-defined duration of time before bringing said application in-focus or displaying a message box, (iii) waiting until a particular state transition has occurred a pre-defined number of times before bringing said application in-focus or displaying a message box, (iv) changing a display icon, (v) not changing the display mode of said application, and (vi) other user defined notification actions.

12. The computer program product of claim 11 wherein said changing said display icon includes (1) when said displayed icon is a standard icon, adding an overlay icon to said standard icon, said standard icon identifying said application and said overlay icon indicating said new state of said application or (2) when said displayed icon includes an overlay icon over said standard icon, changing said overlay icon, said changed overlay icon indicating said new state of said application or (3) when said displayed icon includes an overlay icon over said standard icon, removing said overlay icon, said standard icon indicating said new state of said application.

13. The computer program product of claim 9, wherein the computer readable program when executed on a computer further causes the computer to:
   request a user to configure one or more of said rules to perform an action.

14. The computer program product of claim 9, wherein a rule selects from two or more computer screen display actions based on evaluation of an event that caused a particular state transition of said application.

15. The computer program product of claim 9, wherein the computer readable program when executed on a computer further causes the computer to:
   request a rule from a user when a particular state transition occurs for which no rule exists.

16. The computer program product of claim 9, wherein the computer readable program when executed on a computer further causes the computer to:
   register state transitions of said application and corresponding rules associated with said state transitions with said state transition registry.

17. A computer system comprising a processor, an address/data bus coupled to said processor, and a computer-readable memory unit coupled to communicate with said processor, said memory unit containing instructions that when executed implement a method for dynamically notifying a user of a change in state of an application running on said computer system, said method comprising the computer implemented steps of: loading a software application into said memory unit, said application having multiple possible states and multiple possible state transitions, said application having notification priorities specifying computer screen display actions to be performed upon state transitions of said application or having rules to determine notification priorities; loading a state transition registry and a state transition handler into said memory unit; said application registering a set of state transitions and associated notification priorities, associated rules for determining notification priorities, or both associated notification priorities and associated rules for determining notification priorities with said state transition registry; placing said application in a current display mode and displaying said current display mode on a computer screen; monitoring the state of said software application; upon a state transition of from a current state to a new state, said state transition not initiated by a user of said application, notifying said state transition registry of a particular state transition that has occurred; said transition registry (i) selecting a particular notification priority associated with said particular state transition and passing said particular notification priority to said state transition handler or (ii) said state transition registry requesting said application to evaluate a particular rule associated with said particular state transition, said application evaluating said rule and passing a determined notification priority to said state transition registry, and said state transition registry passing said determined notification priority to said state transition handler; said state transition handler requesting an operating system running on said computer system to handle either said particular notification priority or said determined notification priority; and said operating system processing either said particular notification priority or said determined notification priority, said processing resulting in a change of a display mode of said application from said current display mode to said new display mode and displaying said new display mode on said computer screen.

18. The computer system of claim 17:
   wherein each state of said multiple possible states is independently selected from the group consisting of an idle state, a processing state, an error state, a warning state, an input required state and an application specific state; and
   wherein each rule selects an action selected from the group consisting of (i) bringing said application in-focus or displaying a message box, (ii) waiting a pre-defined duration of time before bringing said application in-focus or displaying a message box, (iii) waiting until a particular state transition has occurred a pre-defined number of times before bringing said application in-focus or displaying a message box, (iv) changing a display icon, (v) not changing the display mode of said application, and (vi) other user defined notification actions.

19. The computer system of claim 17:
   wherein said changing said display icon includes (1) when said displayed icon is a standard icon, adding an overlay icon to said standard icon, said standard icon identifying said application and said overlay icon indicating said new state of said application or (2) when said displayed icon includes an overlay icon over said standard icon, changing said overlay icon, said changed overlay icon indicating said new state of said application or (3) when said displayed icon includes an overlay icon over said standard icon, removing said overlay icon, said standard icon indicating said new state of said application.

20. The computer system of claim 17, the method further including the steps of:
   said state transition registry requesting a notification priority or a rule from a user when a particular state transition occurs for which no notification priority or rule exists; or
   state transition registry executing a default notification priority or a default rule when said particular state transition occurs for which no notification priority or rule exists.

* * * * *